United States Patent [19]
Toyoda et al.

[11] Patent Number: 5,336,472
[45] Date of Patent: Aug. 9, 1994

[54] HONEYCOMB STRUCTURE FOR PURIFYING EXHAUST GAS AND METHOD OF MANUFACTURING SAME

[75] Inventors: Tetsuro Toyoda; Katsunori Matsuoka, both of Akishima, Japan

[73] Assignee: Showa Aircraft Industry Co., Ltd., Tokyo, Japan

[21] Appl. No.: 80,189

[22] Filed: Jun. 22, 1993

Related U.S. Application Data

[63] Continuation of Ser. No. 879,931, May 8, 1992, abandoned.

[30] Foreign Application Priority Data

May 9, 1991 [JP] Japan ................... 3-135784

[51] Int. Cl.$^5$ ........................... B01D 53/34
[52] U.S. Cl. ................... 422/177; 422/180; 422/211; 422/222; 60/299; 502/439; 502/527
[58] Field of Search ............. 422/177, 180, 211, 222; 60/299; 502/439, 527; 55/DIG. 30

[56] References Cited

U.S. PATENT DOCUMENTS

| | | | |
|---|---|---|---|
| 4,186,172 | 1/1980 | Scholz | 422/180 |
| 4,300,956 | 11/1981 | Rosenberger et al. | 422/180 |
| 4,619,912 | 10/1986 | Jalbing et al. | 502/439 |
| 4,719,680 | 1/1988 | Cyron | 502/527 |
| 4,923,109 | 5/1990 | Cyron | 422/180 |
| 4,976,103 | 12/1990 | Takikawa et al. | 60/299 |
| 5,084,361 | 1/1992 | Toyoda et al. | 428/593 |

FOREIGN PATENT DOCUMENTS

| | | |
|---|---|---|
| 3224634 | 10/1991 | Japan . |
| WO 89/07488 | 8/1989 | PCT Int'l Appl. . |
| WO 90/12951 | 11/1990 | PCT Int'l Appl. . |
| WO 92/14913 | 9/1992 | PCT Int'l Appl. . |

*Primary Examiner*—Lyle A. Alexander
*Assistant Examiner*—Rachel Freed
*Attorney, Agent, or Firm*—Oblon, Spivak, McClelland, Maier & Neustadt

[57] ABSTRACT

This device provides a honeycomb structure in which stress concentration on a flat plate in the area of weld with a corrugated plate is avoided in the outer side area of the honeycomb structure, for example, the first and second layers from the outside thereof, whereby cracks and exfoliation of the flat plate are avoided in the area of the weld and the core is also protected from slipping out.

In honeycomb structure 5, corrugated plate 3 and flat plate 1 are disposed alternately and welded to form a wound block. In the range of at least not less than two layers from the outside in the honeycomb structure 5, two sheets of flat plate 1 are used in a pair so that they overlap without welding therebetween. When honeycomb structure 5 is used in an environment wherein thermal cycles of heating and cooling are repeated, the outer side thereof is always cooled by open air, while the inner side is not cooled, as a result of which a difference between the amount of thermal expansion and contraction due to the temperature difference occurs and stress is generated. However, this stress is absorbed by two overlapped sheets of flat plate 1.

11 Claims, 5 Drawing Sheets

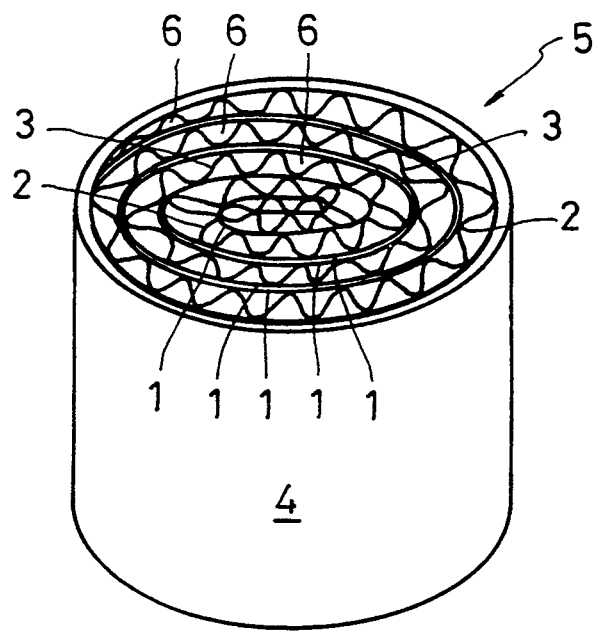

HONEYCOMB STRUCTURE FOR PURIFYING EXHAUST GAS AND METHOD OF MANUFACTURING SAME

This application is a continuation of application Ser. No. 07/879,931, filed on May 8, 1992, now abandoned.

BACKGROUND OF THE INVENTION

1. Field of the Invention

The present invention relates to a honeycomb structure for use in a high temperature environment and to a method of manufacturing the same, and more particularly a honeycomb structure which carries a catalyst as a support matrix for use in a catalytic converter for purifying the exhaust gas from an automobile engine and to a method of manufacturing the same.

2. Prior Art

The honeycomb structure of the conventional type which has been used is usually composed of a strip of corrugated plate which is made by folding the plate into continuously corrugated unevenness and of a strip of flat plate, which are alternately disposed and welded to each other by brazing into multilayers, and made overall into a prescribed configuration in a form such as a wound multilayered block. As the base metal of the above, a corrugated plate and a flat plate each having a uniform thickness have generally been used. In order to withstand use in a high temperature environment, in many cases stainless steel foil or the like have been used, and for the same purpose a brazing filler metal from, for example, the nickel group and the iron group for the brazing filler metal has been used. The honeycomb structure of this type has been used in high temperature environments, particularly in environments subject to thermal cycles of repeated heating and cooling. For example, this honeycomb structure has been used in catalytic converters for purifying the exhaust gas from automobile engines, for carrying the catalyst on its corrugated and flat plates which serve as the support matrix, and the high temperature exhaust gases from the running automobile engine including noxious emissions have been purified through reaction with the catalyst which is effected by passing through the honeycomb structure.

As examples of the conventional honeycomb structure of this type, there are U.S. Pat. No. 5,084,361, 4,282,186 and 4,400,860, and B.P. 1,452,982, applied for by the present inventor.

However, there is the following problem which has been realized about the conventional honeycomb structure of this type. When this honeycomb structure is used as the catalyst support for an exhaust gas purifying apparatus, the temperature of the exhaust gas from the running engine passing through the honeycomb structure is uniformly elevated, and the whole body of the honeycomb structure, i.e., both its outer side or casing side and its inner side or center portion, is heated by the high temperature exhaust gas. Since the outer side of the honeycomb structure is cooled by open air through the casing, its temperature rise when heated is relatively small; but the honeycomb structure is rapidly cooled to a low temperature when the engine of the vehicle is stopped, while the inner side of the honeycomb structure is not cooled by open air, and the temperature rises to a high level when heated and is maintained at that high level for a long time even when the engine of the vehicle is stopped. In the honeycomb structure which is used in a high temperature environment like this, particularly in an environment subject to thermal cycles of repeated heating and cooling, a difference between the amounts of thermal expansion and contraction takes place, as a result of which stress is generated between the outer and inner sides of the honeycomb structure due to the large temperature difference existing therein.

FIG. 1a is an enlarged view showing the principal part of the outer side of the honeycomb structure of the conventional type. In the figure, flat plate 1 is welded to corrugated plate 3 by means of brazing filler metal 2 applied to both sides thereof. Corrugated plate 3 can absorb stress A by deformation; however, since flat plate 1 is fixed at the weld both sides, it is hard to absorb stress A, particularly in the range of the first and second layers from the outside thereof, and cracks B and exfoliation are liable to be generated in the area of the weld due to stress A concentrated thereto, and problems have been observed from the viewpoint of heat proofness, durability and reliability of the honeycomb structure. Hitherto, countermeasures have been taken to prevent concentration of stress A by limiting the location of welding flat plate 1 and corrugated plate 3 to only a part of the total contact line or by providing thicker flat plate 1; however, no fundamental solution has been obtained, and stress A is still concentrated in the area of the weld of flat plate 1, and cracks B and exfoliation are also still liable to be generated.

FIG. 1b is a perspective diagram showing the direction of stress A in the area of the outer side of the conventional type of honeycomb structure. When the honeycomb structure is used as the catalyst support for an exhaust gas purifying apparatus, a large temperature difference is generated as described above between the outer side of the honeycomb structure on the side of casing 4 and the inner side thereof on the side of the center; further, since casing 4 is thicker and of a different material than flat plate 1 and corrugated plate 3, thermal expansion and contraction due to heating and cooling thereof commonly take place but with different amounts on one side, i.e., in casing 4, the outer side of the honeycomb structure, and on the other side, i.e., on the inner side thereof, resulting in stress A working in the reverse direction on each side. For example, when the honeycomb structure is heated, the direction of thermal expansion, i.e., elongation, which occurs is the same as the passing direction of exhaust gas C, however, the amount is small with the outer side former but large with the inside. As shown in FIG. 1b, demarcating the range at the first or second layer from the casing 4 and at the inner side of the honeycomb structure, i.e., in the former, stress A works in the reverse direction of passing exhaust gas C, while in the latter, stress A works in the direction of exhaust gas C. Therefore, on the outer side of the honeycomb structure, in particular in the range of the first and second layers from the outside, stress A concentrates in the area of the weld of flat plate 1 and corrugated plate 3, whereby the core is sometimes caused to slip out, and problems of the honey-comb structure are observed from the view-point of heat proofness, durability and reliability.

SUMMARY OF THE INVENTION

In view of these circumstances, the present invention has been presented to overcome the inconvenience observed in the honeycomb structures of conventional type. An object of the present invention is to provide a new honeycomb structure metallic plate which avoids the concentration of stress by absorbing it between two sheets of flat plates which are provided in at least not less than two layers from the outside so that they overlap but are not welded to each other.

The honeycomb structure of the present invention is made in a honeycomb configuration, in which a strip of metallic corrugated plate which is made by folding the metallic plate into continuously corrugated unevenness and a strip of flat metallic plate are alternately disposed in multilayers of a honeycomb structure. In the range of at least more than one layer from the outside, another flat sheet is provided along said flat plate overlapped without being welded to each other.

The method of manufacturing the honeycomb structure of the present invention comprises the step of preparing the strip of metallic corrugated plate which is made by folding the metallic plate into continuously corrugated unevenness and the strip of flat metallic plate, the step of successively disposing the corrugated plate and the flat plate alternately into multilayers of honeycomb structure, concurrently overlapping another flat plate along said flat plate in the range of at least not less than two layers from the outside, and the step of forming the honeycomb structure into an overall prescribed honeycomb configuration by welding the corrugation plate and the flat plate, without welding the two sheets of over-lapped flat plates.

When this honeycomb structure is used in a high temperature environment, particularly in an environment in which thermal cycles of heating and cooling are repeated, the outer side of the honeycomb structure is always cooled by open air, so that temperature rise of the outer side when heated is relatively small but is rapidly cooled at the time of cooling, while the inner side of the honeycomb structure is not cooled by open air so that its temperature is raised high when heated and further the high temperature is maintained for a long time even when it is cooled.

Due to this temperature difference, a difference between the amount of thermal expansion and contraction is generated, resulting in stress in opposite directions. In this honeycomb structure, since flat plates are overlapped to each other in use and not welded to each other in the range of at least not less than two layers from the outside (i.e. for at least the two outermost layers), the above stress is absorbed between the two sheets of flat plates and stress concentration on the plate, in the area of weld with the corrugated plate is avoidable; consequently, cracks and exfoliation of the plate are prevented, and the core of the honeycomb structure is protected from slipping out. Further, excellent heat resistance durability and reliability are obtained.

BRIEF DESCRIPTION OF THE DRAWINGS

The present invention will be described below with reference to the embodiment shown in the drawings.

FIG. 1b is a perspective diagram showing the direction of stress generated in the part shown in FIG. 1a.

FIG. 2a is a perspective view of a wound-shaped honeycomb structure of an embodiment of the present invention.

FIG. 6a is a perspective view of the corrugated plate, while

DETAILED DESCRIPTION OF THE EMBODIMENT

Figure 6A:
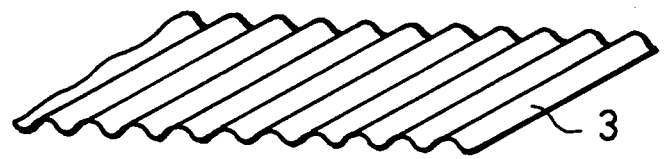
Figure 6B:
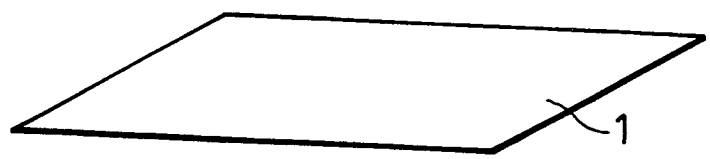
FIG. 6b a perspective view of the flat plate.

According to this manufacturing method, a strip of metallic corrugated plate 3 which is made by folding the flat metallic plate into continuously corrugated unevenness which is shown in the perspective view of FIG. 6a and a strip of metallic flat plate 1, are first prepared. Corrugated plate 3 is formed by corrugating or pressing a strip of metal foil of stainless steel or the like into a plurality of linear corrugated unevennesses, i.e., into crests and troughs folded parallelly and continuously with a fixed pitch and height. For the flat plate, a strip of metallic foil such as stainless steel foil is used. Thereafter, corrugated plate 3 and flat plate 1 thus prepared are disposed alternately into multilayers, further another flat plate is inserted along the flat plate 1 so that they overlap each other in the range of at least not less than two layers from the outside thereof. By welding corrugated plate 3 and flat plate 1 and without welding two overlapped sheets of flat plate 1, honeycomb structure 5 is formed overall into the prescribed configuration. As clearly shown in the drawing figures, the flat plates are non-corrugated.

These steps are described in detail in the following. In honeycomb structure 5 in FIG. 2a, each sheet of corrugated plate 3 and flat plate 1 of the same width are wound from the fixed center and overlapped into multilayers so as to be disposed alternately, and at the whole or a part of the contact line between corrugated plate 3 and flat plate 1, brazing filler metal 2 of the nickel or iron group is applied. Also in the illustrated example, flat plates 1 in the range of the first and second layers from the outside, are disposed so that they overlap each other and brazing filler metal 2 is not provided between these two sheets of flat plate 1. Then by heating corrugated plate 3 and flat plate 1 thus disposed to melt brazing filler metal 2 and by causing filler metal 2 to set, corrugated plate 3 and flat plate 1 are welded therebetween, thereby forming wound-shaped honeycomb structure 5 which has a circular or ellipsoidal total section.

Figure 3A:
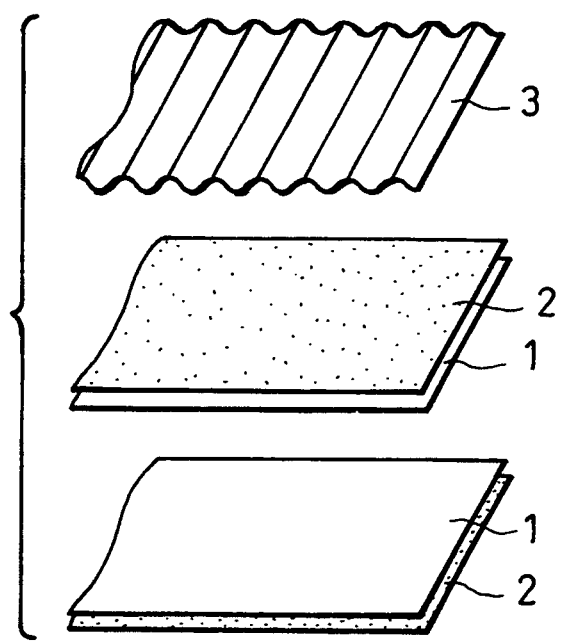
FIG. 3a is a perspective view of the embodiment of the wound-shaped honeycomb structure in the preforming stage, while FIG. 3b a perspective view thereof in its being formed.
Figure 3B:
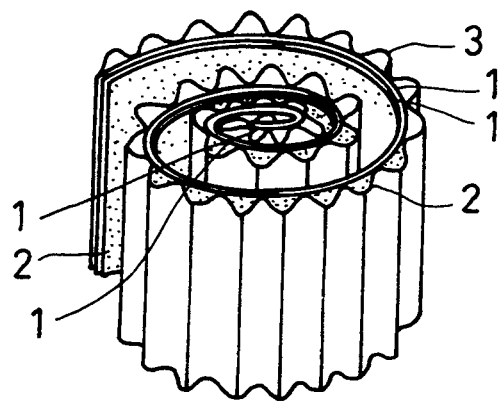
Figure 4A:
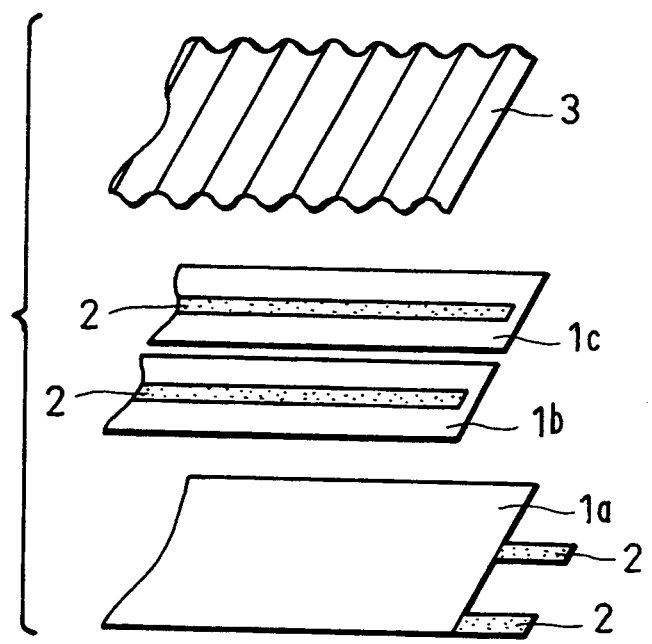
FIG. 4a is a perspective view of another embodiment of the wound-shaped honeycomb structure in the preforming stage, while FIG. 4b a perspective view in its being formed.
Figure 4B:
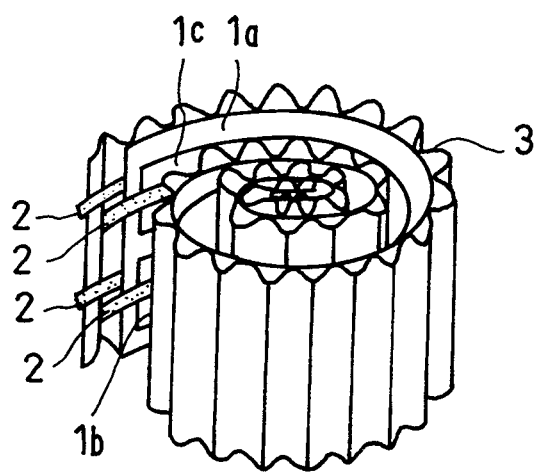

FIG. 3a is a perspective view of an example of a wound-shaped honeycomb structure 5 showing the preformed stage, while FIG. 3b a perspective view while it is being formed. In honeycomb structure 5 in FIG. 3a, all abutting portions of corrugated plate 3 and flat plate 1 are provided with strips of brazing filler metal 2 having substantially the same width as that of both plates and welded together therewith, where flat plate 1 is overlapped in all layers, different from the example in FIG. 2a. Further, FIG. 4a is a perspective view of another example of a wound-shaped honeycomb structure 5 showing the preformed stage, while 4b is a perspective view while it is being formed. In honeycomb structure 5 in FIG. 4a, corrugated plate 3 and flat plate 1 are provided at only a part of the abutting portion thereof with two spaced pieces of brazing filler metal 2 and welded together therewith, in which one of two overlapped sheets of flat plate 1 is in the form of a strip narrower than its partner, which is different from the examples shown in FIGS. 2a and 3a. In other words, when brazing filler metal 2 is partially applied as described above, it is permissible to overlap the two sheets of flat plates 1 only for the range which can cover brazing filler metal 2. Thus, as clearly shown in FIGS. 4a and 4b, the overlapping flat sheet arrangement can be formed with first, second and third flat sheets 1a, 1b and 1c.

Figure 1A:
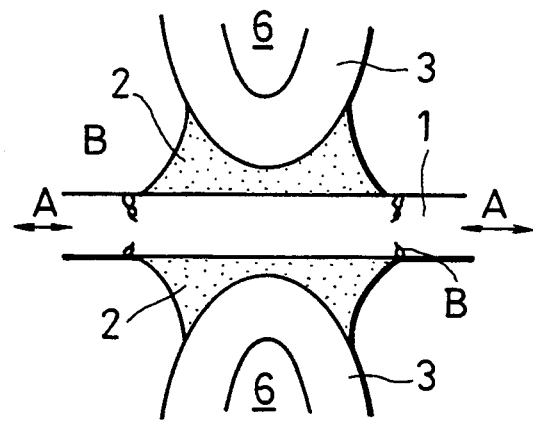
FIG. 1a is an enlarged view showing the principal part of the outer side of the honeycomb structure of the conventional type.
Figure 1B:
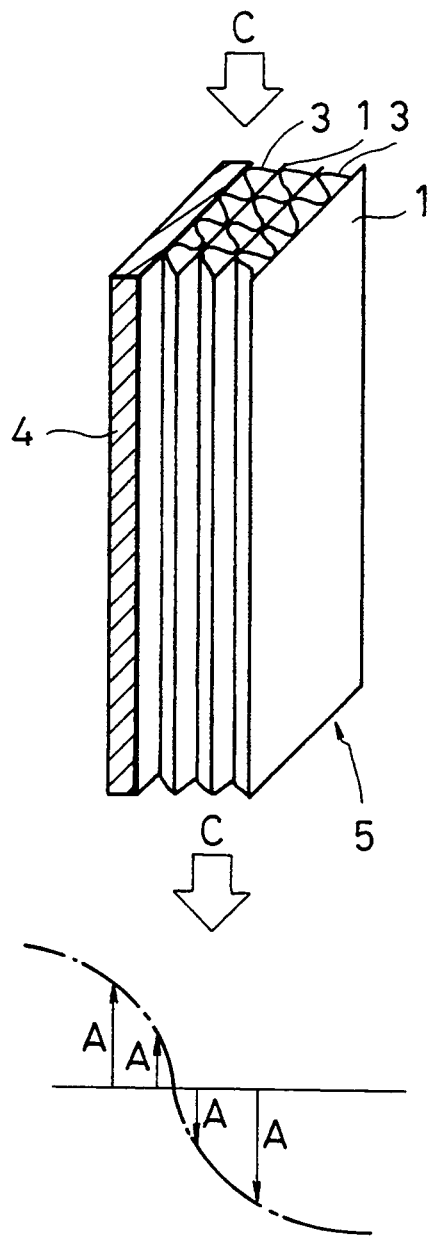

Also, corresponding to the examples shown in FIGS. 3a and 4a, honeycomb structure 5 in the form of the multilayered block shown in FIG. 2b can be provided with flat plate 1 overlapped on all layers or with flat plate 1 partially overlapped only for the range where brazing filler metal 2 is partially applied. Further, every example described above has flat plate 1 disposed on the outermost surface such as the first layer from the outside; however, this is not restrictive and corrugated plate 3 may be disposed on the outermost surface. FIG. 1b is a view showing a catalytic converter which purifies exhaust gas C from an automobile engine, where 4 denotes a casing of cylindrical or square tubular form which acts as the outer casing for housing honeycomb structure 5, and both the casing and the honeycomb structure are welded by brazing filler metal 2.

Figure 5:
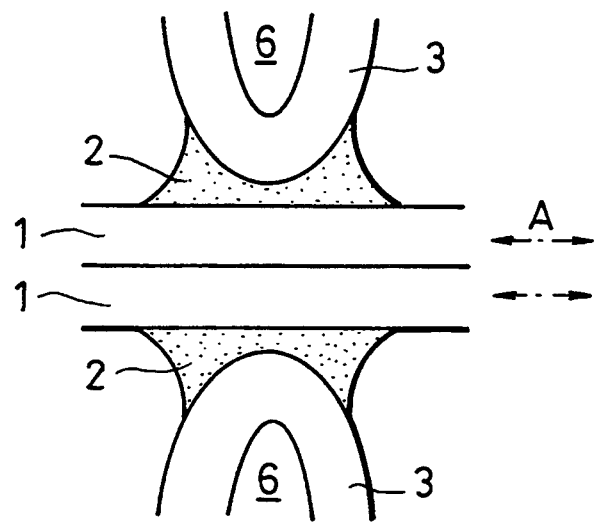
FIG. 5 is an enlarged view showing the principal part of the outer side of the honeycomb structure according to the present invention.

According to the above described manufacturing method, the honeycomb structure 5 is manufactured. In other words, the strip of metallic corrugated plate 3 which is made by folding the metallic plate into continuously corrugated unevenness and the strip of flat metallic plate 1 are alternately disposed and welded into multilayers, whereby honeycomb structure 5 is made into the prescribed, overall configuration in the form of a wound or a multilayered block. In the range of at least more than one layer from the outside, two sheets of flat plate 1 are used in a pair so that they only overlap without being welded to each other. FIG. 5 is an enlarged view showing the principal part of the outer side of honeycomb structure 5 of this type. Corrugated plate 3 and flat plate 1 form a cell wall which comprises a plurality of cells 6 all substantially in the form of triangles, quadrangles, trapezoids, half hexagons or a plurality of hollow pillars of various types. It is known that honeycomb structure 5 has characteristics such as excellent strength-to-weight, light weight, high rigidity and strength, excellent formation for fluid flow, easy formability and economical production cost. Further, it has a large surface area per unit volume, that is, the surface area of the cell wall, i.e., corrugated plate 3 and flat plate 1, is large, so that it can be used in a catalytic converter for purifying exhaust gas from an automobile engine. As the support matrix, corrugated plate 3 and flat plate 1 are provided with the catalyst on the surfaces thereof, and high temperature exhaust gas from the engine of the running automobile including noxious emissions can be purified by passing through a plurality of cells 6 thereby reacting with the attached catalyst.

Through the above process, both the outer and inner sides of honeycomb structure 5 are heated due to the exhaust gas of uniform high temperature passing therethrough and due to thermal reaction of the catalyst reacting with the gas. Since the outer side of honeycomb structure 5 is always cooled by open air through casing 4, its temperature rise when heated is relatively small and is rapidly cooled in the cooling process when the automobile engine is stopped, while the inner side of honeycomb structure 5 is spaced from open air so that it is not cooled by open air and its high temperature is maintained for a long time even in the cooling cycle after the automobile engine is stopped. Thus in honeycomb structure 5 which is used in an environment wherein heating and cooling cycles are repeated, a difference in the amount of thermal expansion and contraction occur. As a result, stress A is generated between the outer and inner sides thereof due to the large temperature difference. As described above with reference to FIG. 1b, stress A acts in two parts of honeycomb structure 5 in mutually reverse directions which demarcate the range by the first or second layer from the outside thereof.

Since two overlapped sheets of flat plate 1 are used without being welded to each other in at least not less than two layers from the outside of honeycomb structure 5, stress A is absorbed between the two sheets of flat plate 1 which are slightly, mutually and slidably deformable, and concentration of stress A in flat plate 1 in the area of the weld with corrugated plate 3 is avoided in the range of the first and second layers from the outside thereof. In other words, in honeycomb structure 5, concentration of stress A is avoided, with the result that cracks and exfoliation of flat plate 1 in the location close to the above is prevented and the core is also protected from slipping out.

Although certain preferred embodiments of the present invention have been shown and described in detail, it should be understood that various changes and modifications may be made therein without departing from the scope of the appended claims.

What is claimed is:

1. A honeycomb structure having a wound configuration comprising: a strip of metallic corrugated plate having a plurality of folds forming corrugations;

first continuous and second continuous separate flat metallic sheets in overlapping relation with respect to each other, wherein said first and second separate flat metallic sheets are not welded to each other;

said corrugated plate welded to at least one of said first and second separate flat metallic sheets;

wherein the first and second separate flat metallic sheets in overlapping relation provide for reduced stresses in said honeycomb structure, thereby reducing excessive stresses which could result in failure within said honeycomb structure.

2. The honeycomb structure of claim 1, wherein said wound configuration is in the form of a wound roll, with said strip of metallic corrugated plate welded to each of said first and second separate flat metallic sheets.

3. A honeycomb structure having a wound configuration a pair of continuous non-corrugated metallic sheets at least portions of which are in overlapping relation, and wherein said portions are not welded together;

metallic corrugated sheet portions disposed on each side of said overlapping portions of said non-corrugated metallic sheets and welded to said pair of non-corrugated sheets wherein the overlapping and non-welded relationship between the non-corrugated sheets accommodates for thermal expansion.

4. The honeycomb structure of claim 3, further including providing a third continuous non-corrugated metallic sheets, and wherein a first of said pair of non-corrugated sheets and said third sheets overlap with a second of said pair at different locations on the second of said pair, and wherein the third non-corrugated metallic sheet and the first are not welded to the second, thereby accommodating for thermal expansion while avoiding excessive use of material.

5. The honeycomb structure of claim 3, wherein said wound configuration is in the form of wound roll, in which said pair of non-corrugated metallic sheets are in overlapping relation and wound into a spiral configuration, with said non-corrugated metallic sheets each including respective first surfaces which are in contact with one another to provide said overlapping relationship, and wherein said non-corrugated metallic sheets also each include respective second surfaces which are welded to said metallic corrugated sheet portions.

6. A method for manufacturing a honeycomb structure having a wound configuration comprising the steps of:
providing a strip of metallic corrugated plate;
providing first continuous and second continuous flat metallic sheets in overlapping relation; and
welding said strip of metallic corrugated plate to said first flat metallic sheet, while leaving said first and second flat metallic sheets unwelded with respect to each other at least in regions which said strip of metallic corrugated plate is welded to said first metallic sheet, wherein the first and second flat metallic sheets in overlapping relation reduce stresses in said honeycomb structure thereby reducing excessive stresses which could cause failure in the honeycomb structure.

7. The method of claim 6, further including welding a strip of metallic corrugated plate to said second flat metallic sheet.

8. The method of claim 6, further including providing a third continuous flat metallic sheet in overlapping relation with said first flat sheet and spaced from said second flat sheet, and wherein a strip of corrugated metallic plate is welded to both said second and third sheets, and wherein said second and third sheets are not welded to said first sheet, such that on a first side of an overlapping region a strip of corrugated plate is welded to said first flat sheet and on a second side of said overlapping region a strip of corrugated plate is welded to both said second and third flat sheets.

9. The method of claim 6, further including the step of winding the honeycomb structure into a wound roll to provide the wound configuration such that said first and second metallic sheets are disposed in a spiral configuration with respective first surfaces of said first and second flat metallic sheets in overlapping relation and said respective first surfaces being non-welded to each other, and further wherein the welding step includes welding said strip of metallic corrugated plate to respective second surfaces of each of said first and second flat metallic sheets.

10. A method for manufacturing a honeycomb structure having a wound configuration comprising:
providing first continuous and second continuous separate flat sheets, and also providing a corrugated metallic sheet, the method also including providing strips of brazing material;
disposing the separate first and second flat sheets in at least partially overlapping relation to thereby form an overlapping region, and disposing the brazing strips on one side of each of said first and second sheets in said overlapping region while not providing brazing between the flat sheets in the overlapping region;
disposing at least one corrugated metallic sheet adjacent said brazing filler strips; and
welding said corrugated metallic sheet to said overlapped non-welded region with said brazing filler strips;
whereby said first and second separate flat sheets in at least partially overlapping relation reduce stresses in said honeycomb structure, thereby reducing excessive stresses which could cause failure in said honeycomb structure.

11. The method of claim 10, further including disposing a third continuous flat sheet to overlap said first sheet with a second strip of brazing provided between said third sheet and said corrugated sheet.

* * * * *